June 10, 1947.　　　E. D. DAHLMAN　　　2,421,999
POTATO DIGGER AND PICKER
Filed Feb. 12, 1944　　　2 Sheets-Sheet 1
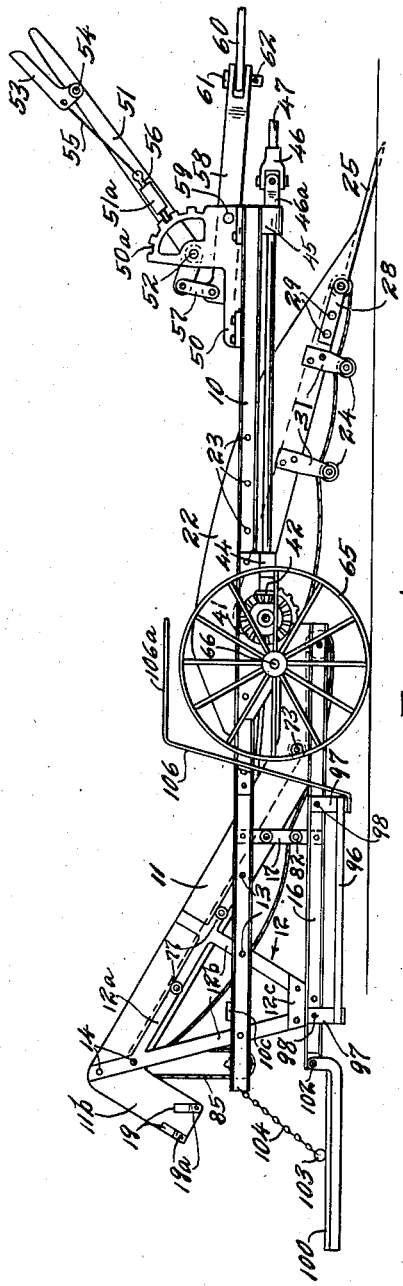
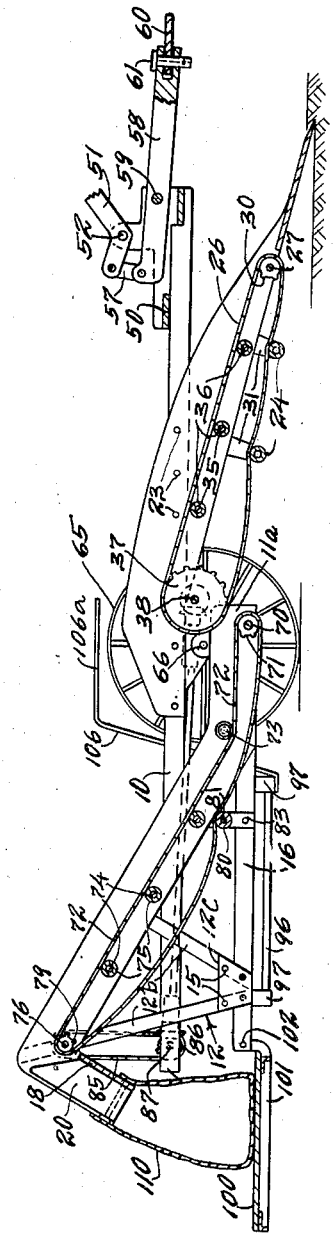
Inventor:
EBEN D. DAHLMAN
By Chas. C. Reif.
Attorney June 10, 1947.　　　E. D. DAHLMAN　　　2,421,999
POTATO DIGGER AND PICKER
Filed Feb. 12, 1944　　　2 Sheets-Sheet 2
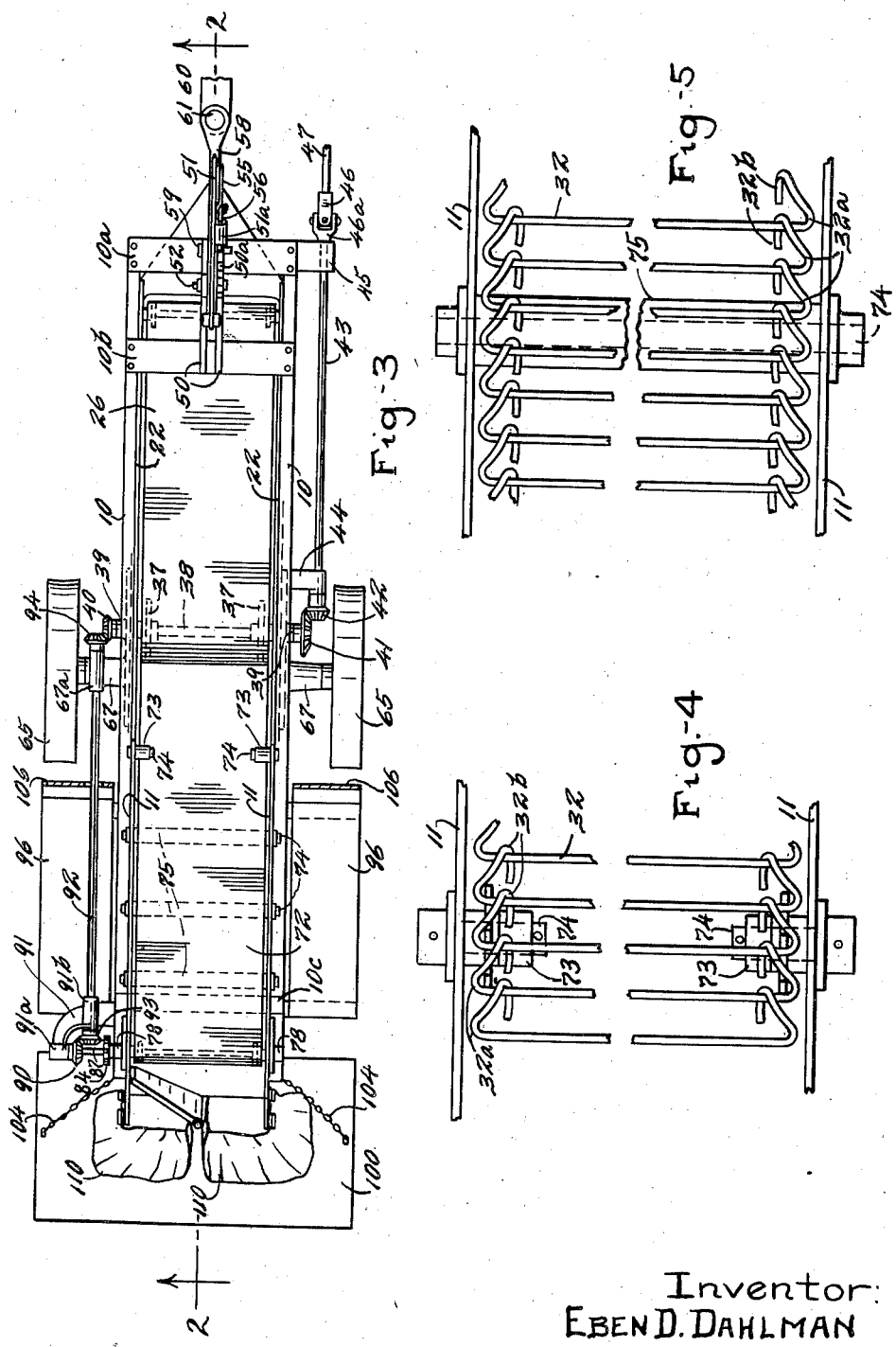
Inventor:
EBEN D. DAHLMAN
By　Chas. C. Reif
Attorney Patented June 10, 1947

2,421,999

UNITED STATES PATENT OFFICE 2,421,999

POTATO DIGGER AND PICKER

Eben D. Dahlman, Grandy, Minn.

Application February 12, 1944, Serial No. 522,100

6 Claims. (Cl. 55—51)

This invention relates to a combined potato digger and picker. With the shortage of manpower and help in agricultural regions, it is very desirable to have a machine which can be operated by a small number of operators and by means of which the potatoes will be handled from the time they are raised from the ground until they are deposited in bags.

It is an object of this invention to provide a fairly simple and efficient machine constructed and arranged to be drawn by and be driven from a power tractor, the same having a frame carrying a potato digger and a potato picker, which frame is supported by a single pair of wheels intermediate the ends thereof.

It is another object of the invention to provide a combined potato digger and picker comprising a frame having a digger mechanism supported at the front thereof and a picker mechanism supported at the rear thereof, said frame being supported on a pair of wheels located substantially at the adjacent ends of said digger and picker, said frame also carrying platforms for supporting picking operators and also preferably a platform for supporting bagging operators.

It is a further object of the invention to provide a potato picker constructed and arranged to be moved with a potato digger having a picker elevating and discharging mechanism, which digger comprises an endless openwork carrier for the potatoes, the same having a substantially horizontal front end for receiving potatoes from the elevating mechanism of said digger.

It is still further an object of the invention to provide a combined potato digger and picker comprising a frame adapted to be connected at its front end to a power tractor, a potato digger carried by said frame at said front end comprising a blade, said front end having means for raising and lowering the same to determine the position of said blade, said frame also carrying a potato picker for receiving the dug potatoes, said picker being provided with a bagging mechanism.

These and other objects and advantages of the invention will be fully set forth in the following description made in connection with the accompanying drawings in which like reference characters refer to similar parts throughout the several views and in which:

Fig. 1 is a view in side elevation of the device;

Fig. 2 is a vertical section taken substantially on line 2—2 of Fig. 3;

Fig. 3 is a plan view of the device, some parts being broken away and others shown in horizontal section;

Fig. 4 is a partial plan view showing the picker elevating carrier; and

Fig. 5 is a partial plan view of another portion of the elevating carrier of the picker and digger.

Referring to the drawings a machine is shown comprising a frame having longitudinally extending spaced parallel members 10, and while these members could be variously formed, in the embodiment of the invention illustrated they are shown as channels having their flanges facing away from each other. Members 10 are connected at their front ends by a plate or bar 10a and also by a second plate or bar 10b some distance in the rear of bar 10a. Members 10 are connected at their rear ends by a plate 10c. Side plates 11 are secured to members 10 in any suitable manner and these extend upwardly and rearwardly adjacent the rear portion of the frame, the same having front portions 11a with substantially horizontal top and bottom edges. Plates 11 have their portions 11b which extend downwardly and rearwardly. Members 11 are disposed in vertical planes and their outer sides have secured thereto frame members 12. Members 12 include portions 12a extending along members 11 adjacent the lower edges thereof and downwardly converging diagonal members 12b connected by a gusset plate 12c at their lower ends. Frame members 12 are connected to the channels 10 by bolts or rivets 13 and are connected to the sides of members 11 adjacent the rear ends of the latter by bolts or rivets 14. Gusset plates 12c are connected to portions 12b by the bolts or rivets 15. Horizontally extending members 16 are connected to plates 12c and while these might be variously formed, in the embodiment of the invention illustrated they are shown as angle bars with their flanges facing outwardly. Members 16 are also connected to members 10 by the vertical bars 17. Bars 16 extend along the outer sides of portions 11a to which they are also connected in any suitable manner. Portions 11b of members 11 have a plate or board 18 extending between their lower edges, thus forming a chute with portions 11b. Small plate-like members 19 are connected to the outer sides of portions 11b and may be provided with lower hook-like portions 19a adapted to hold the top of a bag or sack. A board or plate 20 extends vertically from plate 18 and is pivoted to plate 18 at its lower end so that it may be swung about said pivot and engage with either one of the portions 11b.

The members 10 have connected to their inner sides forwardly of members 11 plate-like members 22 which extend upwardly and rearwardly having their rear ends disposed above members 10 and their front ends disposed therebelow. Members 22 are connected to members 10 by the bolts or rivets 23. Members 22 taper toward their lower front ends and have secured thereto and extending therebetween a blade or shovel 25. This blade is of the type commonly used in potato diggers and may be divided into prongs at its front end. The members 22 form in effect, the sides of a trough and an endless carrier 26 is arranged between said sides. A shaft 27 extends through and between members 22, the same having its ends journalled in bearings formed in a plate 28 secured to the outer sides of members 22 by the bolts 29. Shaft 27 carries a pair of sprockets 30 around which the lower end of carrier 26 passes. Carrier 26 is preferably formed by a series of rod links 32 having their ends reversely bent as shown at 32a and then bent downwardly and rearwardly as shown at 32b. The rod links 32 as shown in Figs. 4 and 5, interlink with each other and can move over the sprockets 30. Rollers 24 carried in brackets 31 support the lower run of carrier 26. The upper run of carrier 26 is supported upon a plurality of spaced rollers 35 supported respectively upon shafts 36 extending between members 22 and having their ends journalled in bearings therein. At its upper end carrier 26 runs over larger sprockets 37 secured to a shaft 38 journalled in bearings 39 secured to the outer sides of plates 22, which shaft has secured at one end a bevelled gear 40 and at its other end a larger bevelled gear 41. Bevelled gear 41 meshes with a pinion 42 secured to one end of a shaft 43 journalled in a bearing 44 secured to one of the bars 10, which shaft extends forwardly and is journalled at its front end in a bearing 45 and is equipped with one member 46a of a universal coupling 46, the other member of which is connected to a shaft 47 in turn adapted to be connected to the tractor motor to be rotated therefrom. Connected to the cross members 10a and 10b is a pair of vertically disposed spaced plates 50. Said plates have disposed therebetween an angle lever 51 which is pivoted to said plates by a pivot bolt 52 extending therebetween. One of said members 50 is formed as a tooth segment 50a. Lever 51 has a grip handle 53 in the form of a bell crank lever pivoted thereto adjacent its upper end by pivot 54, which lever is connected by a small rod 55 to a plunger 56 adapted to engage in the notches of segment 50a. Pin or plunger 56 moves through and is guided in a lug 51a secured to lever 51. A compression coiled spring (not shown) acts on plunger 56, tending to move it toward segment 51a. Lever 51 is of bell crank form, being pivoted at the angle portion thereof and the rear end of said lever is pivotally connected by a link 57 to the rear end of a bar 58 which is in turn pivoted on a pin 59 extending between plates 50. Bar 58 at its forward end is bifurcated and adapted to be connected to the hitch 60 of the tractor by means of a headed pin 61 which will preferably be equipped below bar 58 with a cotter pin 62.

The frame of the machine comprising members 10 and parts carried thereby is supported upon a pair of wheels 65 carried on an axle 66 journalled in bearings 67 secured to the bars 10. The frame, together with the digger and picker mechanism, is supported solely on the one pair of wheels. This pair of wheels as shown, is substantially between the picker and digger or adjacent the discharge end of the digger and the receiving end of the picker.

A shaft 70 extends between portions 11a adjacent the ends thereof, the same being journalled in bearings in said portions and members 16. Shaft 70 carries sprockets 71 adjacent members 11 respectively and an endless openwork carrier 72 runs over or passes around sprockets 71. Carrier 72 is also made of the rods 32 shown in Figs. 4 and 5. A pair of rollers 73 are disposed above the upper run of carrier 72 and respectively at the sides thereof, the same being journalled on pins 74 carried in members 11. It will be noted that the portion of the upper run of endless carrier 72 between sprockets 71 and rollers 73 is substantially horizontal and this portion is disposed beneath the delivery end of the endless carrier 26. A plurality of spaced parallel shafts 74 extend between members 11, being journalled in bearings 77, and the same carry rollers 75 disposed beneath the upper run of carrier 72. Another shaft 76 extends between members 11 and is journalled in bearings 78 secured to the sides of members 11 and the same has secured thereto adjacent its ends respectively sprockets 79 over which the upper end of carrier 72 passes. The lower run of carrier 72 is supported on a roller 80 carried on a shaft 81 journalled in bearings 82 having standards secured to members 16 by bolts 83. Shaft 76 also has secured thereto at the outer side of one member 11 a sprocket 84 over which runs a chain 85 also running over a sprocket 86 secured to a shaft 87 carried in a bearing connected to one of the members 10. Shaft 87 extends beyond sprocket 86 and has secured thereto a bevelled gear 90. Bevelled gear 90 engages at one end a bearing 91a carried in a bearing bracket 91 in which shaft 87 is also journalled. Bearing bracket 91 is secured to one of the members 10 and also carries a bearing 91b in which is journalled one end of a shaft 92. Shaft 92 has secured thereto a bevelled gear 93 meshing with bevelled gear 90 and having its end engaging the end of bearing 91b. Shaft 92 extends substantially horizontally and is journalled at its other end in a bearing 67a forming part of one of the axle bearings 67 and has secured to its end a bevelled gear 94 meshing with bevelled gear 40 and engaging the end of bearing 67a. Platforms 96 are provided at each side of the picker mechanism, the same being supported upon angle brackets 97 secured by bolts 98 to the members 16. A platform 100 is provided at the rear of the picker mechanism, the same being carried on a bracket 101 having vertical portions secured by bolts 102 to the rear end of member 16. Eyelets 103 are secured in the top of platform 100 and connected by chains 104 to the ends of members 10. Chains 104 may be constructed and arranged to be adjustable to somewhat vary the position of platform 100. Guard members 106 are secured beneath the front ends of platforms 96 and have portions extending substantially vertically and other horizontal portions 106a extending over the tops of wheels 65 respectively.

In operation, the device as shown will be connected to the portion 60 which may constitute a tractor hitch and as stated, shaft 47 will be connected to the tractor motor so as to be rotated thereby. The operator will adjust lever 51 so that the front end of the digger blade or shovel 25 will be in the desired position. It will be seen that when lever 51 is moved clockwise that the front end of the frame comprising members 10 will be raised and this will, through members 22, raise the blade 25. With the blade 25 properly positioned, the device will be drawn forward over the potato row and the potatoes in the ground will be lifted by blade 25 and will pass upwardly and rearwardly thereon and onto the elevating mechanism comprising endless member 26. This mechanism will be operated through shafts 47 and 43 and through gears 41 and 42 which will rotate shaft 38 and sprockets 37. As the upper run of endless carrier 26 moves upwardly there is more or less motion of the bars 32 and some sagging of the bars between the rollers 36 so that a sifting effect is exerted on the potatoes and the very small potatoes and the dirt lifted by blade 25 pass through the carrier 26. The larger potatoes together with some vines, weeds and other foreign matter, will be carried upwardly on the elevator 26 and these will be discharged onto the front end of endless carrier 72. The potatoes falling on the horizontal portion of carrier 72 are given a chance to supply a position themselves on and between the bars 32 before being carried upwardly. The potatoes are thus evenly distributed and carried upwardly in an evenly distributed arrangement. If the potatoes are delivered to a downwardly inclined portion of an endless carrier they tend to roll down on the carrier and accumulate at the bottom thereof so that they are not carried up in an evenly distributed manner. The horizontal portion of conveyor 72 therefore, performs an important function and the potatoes are given a chance to settle and be engaged by the bars 32 to be carried upwardly thereby. The picking operators stand on the platforms 96 and as the elevating means 72 carries the potatoes and other matter upwardly, the pickers pick out pieces of vine, weeds and any other matter that may be on the carrier so that when the carrier reaches its upper end only the potatoes to be sacked remain thereon. These potatoes are directed into the portion 11b which as stated, with member 18 forms a chute and the potatoes are directed by member 20 to one side or the other of the chute and to a bag 110 which will be held at its end in position to receive the potatoes by being engaged on the members 19a. The bag can conveniently rest on platform 100 as shown in Fig. 2. The operator will stand on platform 100 and when the bag is filled he will lift it and place it on the ground. One bag can be placed in position at the end of the delivery chute while another is being filled. The conveyor or elevator 72 is of course, driven from shaft 38 through gears 40 and 94, shaft 92, gears 93 and 90, shaft 87, chain 85 and shaft 76 to which the driving sprockets 79 are secured. The guard members 106 protect the operators from contact with the wheels 65. If the ground is wet the wheels 65 would carry considerable mud. The potatoes are thus lifted from the ground, sifted, cleaned and bagged in one continuous operation.

From the above description it will be seen that I have provided a comparatively simple, compact and very efficient potato harvesting machine. The digger and picker are structurally combined with a unitary frame which in turn is carried by a single pair of wheels. The potatoes are handled with much smaller number of operators than where the separate digger and picker are used. It is not necessary at any time to pick the potatoes off of the ground and duplicate operations of picking and bagging heretofore carried out are eliminated. One trip of the tractor and machine along the row results in the complete harvesting and bagging of the potatoes. With the present conditions where producers are asked to increase their production, when manpower is short, such a machine is very desirable and will assist greatly in the desired production of food. The machine has been amply demonstrated in actual practice and found to be very successful and efficient.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A combined potato digger and picker constructed and arranged to be drawn and driven from a power tractor having in combination, a frame, a digger supported from said frame comprising a digger blade, an open work elevating mechanism disposed adjacent the rear end of said blade for receiving potatoes from said blade and sifting and elevating the same, means for operating said mechanism from said tractor, a picker supported on said frame comprising an elevating means longitudinally alined with and moving in the same general direction as said elevating mechanism having a substantially horizontal receiving portion disposed below the rear end of said elevating mechanism to receive said potatoes therefrom, means for driving said elevating means from said first mentioned means, said frame comprising spaced substantially parallel members extending respectively longitudinally at each side of said digger and picker, a single pair of wheels supporting said frame substantially midway between the ends thereof, a platform carried by said frame at one end of said elevating means and disposed at the side of said elevating means for supporting a picking operator and a platform at the rear end of said elevating means for supporting a bagging operator.

2. A combined potato digger and picker constructed and arranged to be drawn and driven from a power tractor having in combination, a frame, a digger supported from said frame comprising a digger blade and an open work elevating mechanism disposed adjacent the rear end of said blade for receiving potatoes from said blade and sifting and elevating the same, a picker supported on said frame comprising an elevating means longitudinally alined with said elevating mechanism having a substantially horizontal portion of considerable extent disposed beneath the discharge end of said elevating mechanism, means for driving said elevating mechanism and said elevating means from said tractor, said frame comprising a pair of substantially horizontal members extending longitudinally respectively at each side of said digger and picker and a pair of wheels for supporting said frame, digger and picker disposed substantially between said digger and picker.

3. A combined potato digger and picker constructed and arranged to be drawn and driven from a power tractor having in combination, an elongated substantially horizontal frame having spaced substantially parallel side members disposed respectively at the sides of said picker and digger, means for connecting said frame at its front end to a power tractor, a pair of wheels for supporting said frame adjacent the center thereof, a potato digger comprising an elevating mechanism supported at the front end of said frame and a potato lifting blade, a potato picker comprising an elevating means carried at the rear end of said frame and longitudinally alined with said elevating mechanism, said elevating means having a front receiving end spaced below the rear discharge end of said elevating mechanism and adapted to receive from said elevating mechanism, and means adjacent the front end of said frame for raising and lowering the front end of said frame to raise and lower said blade while maintaining said relation between the rear end of said elevating mechanism and the front end of said elevating means.

4. A combined potato digger and picker constructed and arranged to be drawn by and driven from a power tractor having in combination, a frame, a digger supported from said frame comprising a digger blade and an openwork elevating mechanism disposed adjacent the rear end of said blade for receiving potatoes from said blade and sifting and elevating the same, a picker supported on said frame comprising an elevating means longitudinally alined with said elevating mechanism and having a substantially horizontal front end spaced a considerable distance below and adapted to receive from the rear end of said elevating mechanism, a platform carried at the lower part of said frame and disposed alongside of said elevating means, a downwardly and rearwardly extending chute at the rear end of said elevating means to which said elevating means delivers, means on said chute for holding a bag and a platform for supporting bags and bagging operators disposed below and rearwardly of said chute.

5. The structure set forth in claim 4 and said frame having spaced substantially parallel side members disposed respectively at the sides of said picker and digger and a single pair of wheels for supporting said frame rotatable about an axis disposed substantially midway of said frame and at the rear end of said elevating mechanism.

6. A combined potato digger and picker device constructed and arranged to be drawn in the rear of the power tractor having in combination, a frame, a digger mechanism supported by said frame including an elevating mechanism for the potatoes and vines, said elevating mechanism having a discharge upper end, a picker comprising an endless openwork carrier having a front substantially horizontal receiving portion disposed beneath and spaced vertically a substantial distance from said discharge end and adapted to receive potatoes and vines from said discharge end, said carrier having a rear upwardly inclined portion leading from said horizontal portion, means for supporting picking operators at the sides of said upwardly inclined portion, said frame having spaced substantially parallel side members disposed respectively at the sides of said picker and digger, a pair of wheels for supporting said device disposed respectively at the outer sides of said frame and substantially midway of the same longitudinally and revoluble about an axis disposed substantially at said discharge end, said wheels constituting the sole supporting means for said device and frame.

EBEN D. DAHLMAN.

REFERENCES CITED

The following references are of record in the file of this patent:

UNITED STATES PATENTS

| Number | Name | Date |
| --- | --- | --- |
| 1,569,038 | Schmechel et al. | Jan. 12, 1926 |
| 1,580,683 | Sang | Apr. 13, 1926 |
| 1,682,554 | Dahlman | Aug. 28, 1928 |
| 1,333,493 | Kilkenny | Mar. 9, 1920 |
| 1,848,781 | Hansen | Mar. 8, 1932 |
| 1,935,908 | Johnson | Nov. 21, 1933 |
| 2,015,549 | Dwyer | Sept. 24, 1935 |
| 1,487,273 | Sang | Mar. 18, 1924 |
| 2,379,198 | Templeton | June 26, 1945 |

FOREIGN PATENTS

| Number | Country | Date |
| --- | --- | --- |
| 404,199 | Germany | Oct. 13, 1924 |
| 543,411 | Great Britain | Feb. 24, 1942 |